Nov. 9, 1926.

F. H. DAHNKE 1,606,151

FIREPROOF BOX

Filed July 7, 1924

INVENTOR.
FRED H. DAHNKE.
BY
Harry Schroeder
ATTORNEYS.

Patented Nov. 9, 1926.

1,606,151

UNITED STATES PATENT OFFICE.

FRED H. DAHNKE, OF OAKLAND, CALIFORNIA.

FIREPROOF BOX.

Application filed July 7, 1924. Serial No. 724,592.

My invention is an improved fire resistant box, applicable to the safe keeping of valuable papers, jewelry, etc.

The object of my invention is to provide a fire resistant box which is simple in construction, inexpensive to manufacture, and highly efficient for the purpose desired.

In the annexed drawing in which my invention is illustrated:

Figure 1:
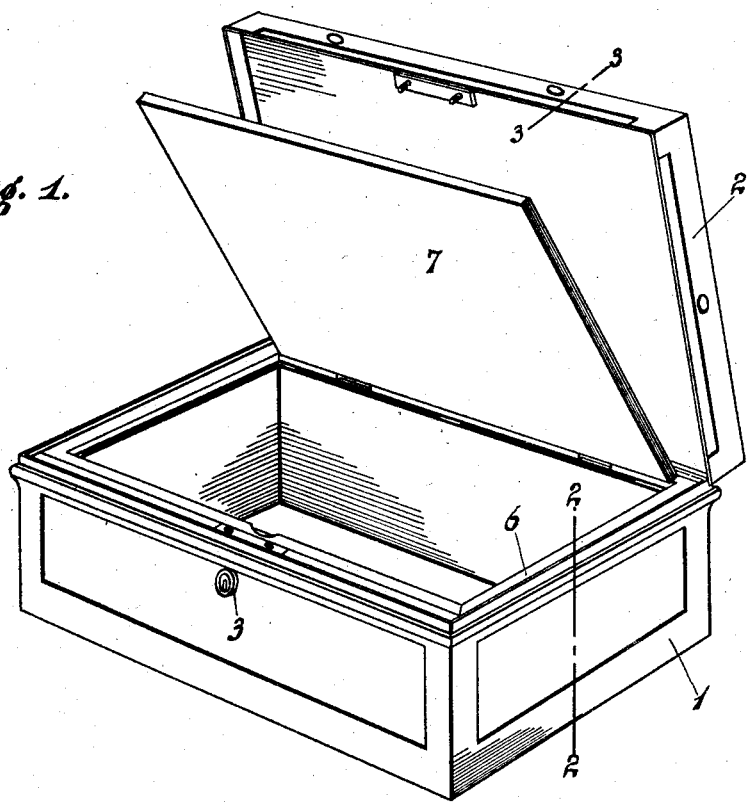
Figure 1 is a perspective view of my box.
Figure 2:
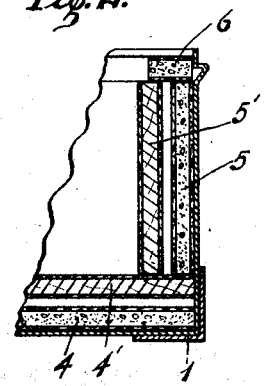
Figure 2 is a fragmentary sectional view taken on the line 2—2 of Figure 1.
Figure 3:
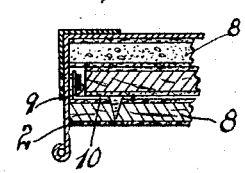
Figure 3 is a fragmentary sectional view taken on the line 3—3 of Figure 1.

Referring more particularly to the drawing, a metal casing 1 has a cover 2 hinged thereto, and a suitable lock 3 is mounted in said casing to engage said cover.

The casing 1 and cover 2 are lined with a fire resistant board, of any desired type such as red-wood covered on both sides with a layer of cardboard, or asbestos, covered in the same way, or any other light inexpensive structure. The bottom of the casing 1 is covered with a layer of asbestos 4, and a layer of this board 4', and the sides are covered with two or more similar layers of asbestos board 5—5' slightly spaced apart to form an air space. A cover strip 6 extends around the upper edges of the layers 5—5', which also serves as a binding strip, and makes a neat appearance.

An auxiliary cover 7, formed of the above described board, is hinged at the rear to the casing 1.

Figure 4:
Figure 4 is an elevation of the holding clip for the cover plate.
Figure 5:
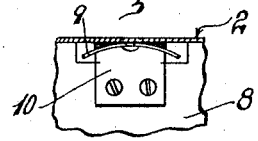
Figure 5 is a plan view of the same.

The cover 2 is lined with a layer of asbestos 8' and two or more layers 8 of the composition board fabricated as above suggested. The lowermost board 8 is held in place in the following manner: curved steel strips 9 are riveted to the inner surface of the cover 2, as shown in Fig. 5. Plates 10, having one end bent up and notched as seen in Fig. 4, are secured by screws to the upper surface of the lowermost board, which is cut away adjacent the plate 10, as shown. The notched end of plate 10 engages strip 9 and is held in position thereby, being wedged between the strip and the cover. The lowermost board 8 is, of course, spaced somewhat from the cover 7 so as to leave an air space similar to that formed in the walls of the box.

Having described my invention, I claim:

A fireproof box comprising a metal casing, said casing being lined with a plurality of layers of board including asbestos and wood, a hinged cover on said casing, a lining in said cover comprising a plurality of layers of board, strips secured to said cover, and clips secured to the top layer of board adapted to engage said strips.

In testimony whereof I affix my signature.

FRED H. DAHNKE.